Patented Apr. 30, 1940

2,198,939

UNITED STATES PATENT OFFICE 2,198,939

PIGMENTED MATERIAL

Charles H. Hempel, Manitowoc, Wis., assignor to Heresite & Chemical Company, a corporation of Wisconsin No Drawing. Application September 25, 1939, Serial No. 296,524

7 Claims. (Cl. 91—70)

This invention relates to a synthetic resinous coating and more particularly to a smooth coating consisting of a plurality of interacted layers of pure phenol-formaldehyde resin including filler upon a non-porous and particularly a metallic base. A porous or fibrous base does not produce a smooth or impervious coating when prepared as here described.

The problem of utilizing phenol-formaldehyde resins for the protection of metal objects against severe corrosion has been one which evaded solution for a long time. Simple phenol-formaldehyde resins are condensates which are insoluble in drying oil. If the reaction is stopped before the infusible and insoluble stage is reached, however, it is possible to secure an alcohol-soluble resin. Such resins, however, are lacking in adhesion and flexibility and were not considered suitable for coating work.

It has now been discovered that such resins may be adapted for metal coating, provided that they are used in a medium which is free from oil, and provided an inert filler is included with the resin in sufficient proportions.

In coating a metallic object such, for example, as a tank, drum, or spinning bucket, or any other metallic object of which it is desired to protect more than one surface—i. e., in which the object has edges, at least one of which has to be protected by the resin—it was universally found that the resinous film would give protection on the main surface, but that corrosion would commence at the corners or edges and would rapidly undercut the resin so that it would chip off in large sections.

The use of an oil varnish of the resin would eliminate this difficulty, provided sufficient coats were employed, but the presence of the oil left the resin readily susceptible to corrosion throughout.

A simple plurality of coatings of oil-free resins would not accomplish this result. Clear phenolic resin will not accomplish this purpose even where twelve or more coats are employed.

In accordance with this invention, a potentially active, clear, phenol-formaldehyde resin is dissolved in an appropriate solvent and from 10% to 45% by volume of the resin, and preferably from 25% to 35%, of an inert, very finely divided pigment or filler is incorporated therewith. Suitable fillers are ochre, sienna, cinnabar, barium sulfate, lithopone, zinc oxide, zinc sulfide, umber, titanium dioxide and kaolin. The pigment should be inorganic, non-fibrous and suspensible in the resin solution. Pigments such as graphite, asbestos, quartz, asbestine, lampblack and cellulose are unsuitable for one or more of these reasons.

When only 10% of pigment is employed it is necessary to use at least six coats of the pigmented resin in order to obtain protection of the corners. With 40% of pigment, four coats provide a suitable protection, and at 45% two coats, applied by spraying, will thoroughly protect the corners. Just why the pigments provide extra protection, is not thoroughly understood. On any given surface, as distinguished from the edges thereof, the pigmented resin is less corrosion-resistant than the unpigmented material. It is believed that the improvement is due to the fact that the pigments provide a buffer against slow shrinkage of the resin after the contained solvent has evaporated. Potentially reactive resins of the phenol-formaldehyde type contain a small percentage of water which is evaporated during the baking stages. The loss of this induces a shrinkage in the resin which apparently becomes most apparent at the corners or edges. Whatever the cause of the difficulty may be, however, the addition of the pigment overcomes it.

Furthermore, the pigmented resin, once applied, affords a base for the attachment of clear unpigmented resin which can thus improve the corrosion resistance of the object.

That is, a three-dimensional metallic object, when coated on all of its outer surfaces with the pigmented resin, may then be coated with unpigmented resin which will protect at the corners or edges as well as on the planar surfaces. By building up a composite series of layers, it is thus possible to achieve all of the corrosion resistance of the clear unpigmented resin and yet have the permanence and covering quality of the pigmented material.

Metal surfaces which are to be covered with the coating should be sandblasted or etched with a caustic solution as a preliminary step in order to obtain maximum adhesion. The coating may be applied by spraying, dipping or brushing.

The coating is applied as a thin layer in the ordinary manner and is air dried sufficiently to permit the escape of solvent. The coated material is then baked sufficiently to remove all volatile matter, and to put the resin in condition where the solvent will not affect it during a subsequent dipping or spraying operation, but not sufficiently to remove all of its reactive characteristics. A second layer is then applied and the treatment repeated. Other coatings are added until the desired thickness has been reached. Normally from four to six coatings are applied and preferably of the order of six. After the application of the final coat, the material is baked at a temperature and for a time sufficient to convert the resin to its final insoluble, infusible stage.

Surfaces prepared according to the above method are highly resistant to most chemical agents and possess a high shock resistance. For example, this coating will resist any concentration of sulfuric acid, hydrochloric acid, hydrofluoric acid, chromic acid, acetic acid, formic acid, phosphoric acid, carbolic acid, formaldehyde, ammonium hydroxide, sodium carbonate, hydrocarbons, etc. It also offers a high insulating protection against electric current. The coatings are particularly suitable for the protection of tanks, drums, rayon spinning machine parts, especially aluminum spinning buckets, aluminum spinning spools, aluminum traverse bars, aluminum duct systems, filter presses, blowers and ventilators, metal beer kegs and shipping containers, pipes, ducts, fractionating towers, machine parts, and the like, against chemical corrosion.

As an example of the invention a pure phenol-formaldehyde resin is prepared by incorporating with 100 parts of phenol 150 parts of 40% by volume formaldehyde and one part of ammonium hydroxide (26° Bé.). These ingredients are boiled in a reflux condenser until resin precipitates and the condensation is then continued for ½ hour more. The water present is then removed by vacuum distillation until the temperature of the resin reaches 108°–115° C. and a sample remains clear and is without stickiness under cold water. The resultant resin is then dissolved in ethyl alcohol to form an approximately 85% solution of the resin.

This solution is mixed with suitable pigments or filler and ground in a pebble mill until a film of the coating is free from coarse particles. This requires upwards of 96 hours of grinding. The grinding must be carried out in the resin solution since the ordinary solvents have no suspending effect in the absence of oil.

As a specific example of the invention, 35% of barium sulphate by volume was employed as the filler and was incorporated as above set forth. After grinding, the mixture was treated with a solvent, for example, one comprising:

| | Per cent |
|---|---|
| Ethyl alcohol | 50 |
| Toluol | 35 |
| Butyl alcohol | 10 |
| Amyl acetate | 5 |

The dilution of the resin in the solvent will, of course, depend on the manner of application and the material to which it is to be applied. For example, for dipping or spraying it may be diluted to a specific gravity of approximately 1.000. When dipped, the dipped base is allowed to drain, the excess material which clings to the bottom of the article is removed, and the solvent is permitted to escape from the coating. The article is then baked in an oven for approximately 10 minutes at approximately 150° C. At 80° C. a three hour heating period may be employed, whereas, at 100° C. it may be ½ to 1 hour. This process is repeated until four layers of the coating have been thus applied. Thereafter two coats of the unpigmented resin are applied, dissolved in the same solvent. After applying the last coating the baking is carried out for approximately two hours at 150° C. No pressure is employed.

The coated article as prepared by the above process has a glass-like appearance and a remarkable hardness.

Times and temperatures may of course be varied, but it is important that the intermediate layers be not completely converted to the infusible insoluble stage before the application of the next coat.

The ammonium hydroxide used in the preparation of the resin apparently acts merely as a catalyst, and any other suitable catalyst may be employed in its place.

The use of the filler prevents cracks or other failures of coverage due to the shrinkage of the resin in the baking process. The filler above mentioned likewise preserves the natural flexibility of the resin. The filler should naturally be highly inert, otherwise the chemical resistance of the coating will be reduced.

The unfilled resin is more highly resistant to chemical corrosion than that having a filler. It does not adhere as well to other materials.

Inasmuch as the covering power of the various pigments depends to a considerable extent upon their specific gravity, the ratio of pigments by weight to the resin will vary considerably. For example, ochres which have an average specific gravity of about 2.8 are ordinarily employed in a ratio of approximately 100% by weight of the pure resin. For example, in a resin solution containing 70% resin by weight 30 parts of ochre are preferably employed to 43 parts of resin by weight. This amount may be decreased to 15 parts or increased to approximately 40–45 parts.

Siennas having an average specific gravity of 3.3 are employed in slightly larger proportion by weight. Preferably 35 parts of sienna are employed for 43 parts by weight of a 70% resin solution. Umbers which have a specific gravity of about 3.7 are preferably employed in a ratio of about 40 parts umber by weight to 43 parts of the resin solution.

Titanium dioxide and zinc sulfate, each of which has a specific gravity of approximately 3.9 are employed in a ratio of approximately 42 parts by weight of the pigment to 43 parts of the aforesaid resin solution.

Cinnabar, which has a density of about 4.3, is preferably employed in a ratio of 45 parts of cinnabar by weight to 42 parts by weight of the aforesaid resin solution.

Barium sulfate and lithopone, each of which has a specific gravity of about 4.3, are used in a ratio preferably of 46 parts by weight of the pigment to 43 parts of the aforesaid resin solution.

As another example of resin which is suitable for application as aforesaid, 100 parts of phenol and 100 parts of 40% by volume formaldehyde solution and 10 parts of concentrated ammonium hydroxide are brought to the boiling point. After about 8 to 10 minutes a resin precipitates and as soon as the precipitation is complete water is distilled from the resin under vacuum until a sample of the resin which has now become viscous forms a solid non-tacky bead under cold water. At this point the process is interrupted and the molten resin poured into pans and permitted to cool. The resin is then dissolved to produce a solution containing 70% resin and 30% alcohol by weight.

Any other pure phenol-formaldehyde resin at a stage where it is soluble in alcohol may be employed.

The resin solution is then mixed with the pigment, charged into a mixer or kneader and thoroughly mixed for about one hour. The mixture is then transferred to a pebble mill which is about half full of pebbles in which it is ground for at least 96 hours.

Instead of grinding in a pebble mill the suspension of the pigment may be accomplished by grinding in a buhr stone mill, repeating the operation from two to four times until proper suspension is secured.

It will be appreciated that in preparing the multiple coated material that the use of clear oil-free resin provides the greatest corrosion resistance and is therefore preferred as a finished coating. However, it is frequently desirable that the final coatings include relatively small amounts of pigments for decorative purposes and in stating in some of the claims that the final layers are unpigmented I mean that these layers do not contain sufficient pigment materially to lessen corrosion resistance. Ordinarily, the pigment content cannot be over 20% by weight of the dry resin. Pigment such as titanium dioxide, aluminum powder, chrome green and cinnabar can be employed in amounts less than 20% for decorative purposes in the final coatings. Such a quantity of pigment would be valueless for the purposes required in the undercoatings.

This application is a continuation-in-part of my co-pending application Serial No. 153,861, filed July 15, 1937, which was a continuation-in-part of an earlier co-pending application Serial No. 112,829, filed November 25, 1936. The present application is also a continuation-in-part of my co-pending application Serial No. 215,476, filed June 23, 1938, which was also a continuation-in-part of Serial No. 112,829, filed November 25, 1936.

What I claim as new, and desire to secure by Letters Patent, is:

1. The method of forming a smooth, adherent, impermeable, highly corrosion resistant coated metal article which comprises applying to at least one surface of the metal a solution of a potentially reactive oil-free phenol-formaldehyde resin containing from 10% to 45% by volume of the resin of an inert, inorganic, non-fibrous, suspensible pigment suspended therein, drying and baking the coating to leave it potentially reactive but inert to solvent during a subsequent dipping or spraying treatment, applying at least one additional coating of similarly pigmented oil-free resin thereto, drying and baking to leave the coating potentially reactive but inert to solvent in any subsequent dipping or spraying treatment, and then converting the applied layers to the non-reactive state by the application of heat while maintaining the surface free from contact with other solid material.

2. The method of forming a smooth, adherent, impermeable, highly corrosion resistant coated metal article which comprises applying to at least one surface of the metal a solution of a potentially reactive oil-free phenol-formaldehyde resin containing from 10% to 45% by volume of the resin of an inert, inorganic, non-fibrous, suspensible pigment suspended therein, drying and baking the coating to leave it potentially reactive but inert to solvent during a subsequent dipping or spraying treatment, applying at least one additional coating of similarly pigmented oil-free resin thereto, drying and baking to leave the coating potentially reactive but inert to solvent in any subsequent dipping or spraying treatment, then applying at least one layer of oil-free unpigmented phenol-formaldehyde resin, drying and baking to leave the coating potentially reactive but inert to solvent in any subsequent dipping or spraying treatment.

3. The method as set forth in claim 1 in which at least four layers of pigmented oil-free resin are successively applied, and these are succeeded by at least two layers of unpigmented oil-free phenol-formaldehyde resin.

4. The method as set forth in claim 1 in which the pigment is used in a ratio of from 25% to 35% by volume of the resin.

5. A metal object having at least one surface and an adjacent edge coated with a smooth, adherent, impermeable, highly corrosion resistant coating produced by the process of claim 1.

6. A metal object having at least one surface and an adjacent edge coated with a smooth, adherent, impermeable, highly corrosion resistant coating produced by the process of claim 2.

7. A metal object having at least one surface and an adjacent edge coated with a smooth, adherent, impermeable, highly corrosion resistant coating produced by the process of claim 2, said pigmented layers containing from 25% to 35% pigment by volume.

CHARLES H. HEMPEL.